Inventor
Thomas P. Heckman
By: Stone, Nierman,
Burmeister & Zummer
Attorneys

Oct. 27, 1964   T. P. HECKMAN   3,154,222
LIQUID DISPENSER
Filed Sept. 13, 1962   3 Sheets-Sheet 2

Inventor
Thomas P. Heckman
By: Stone, Nierman,
Burmeister & Zimmer
Attorneys

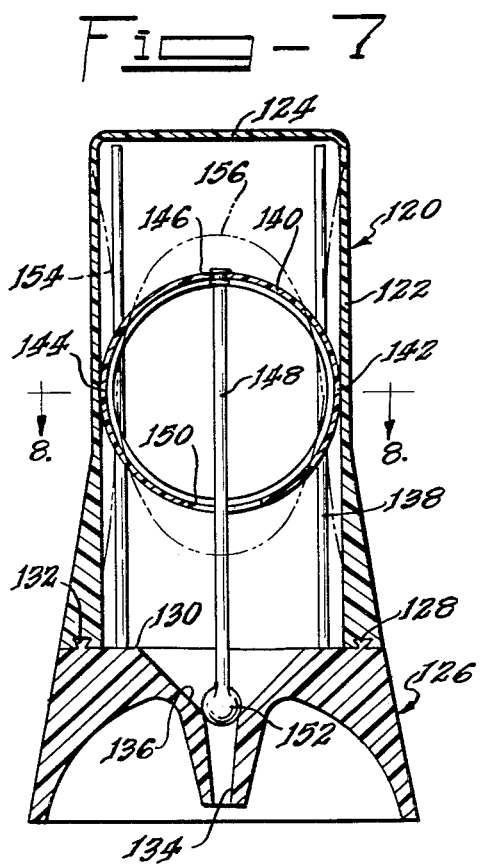
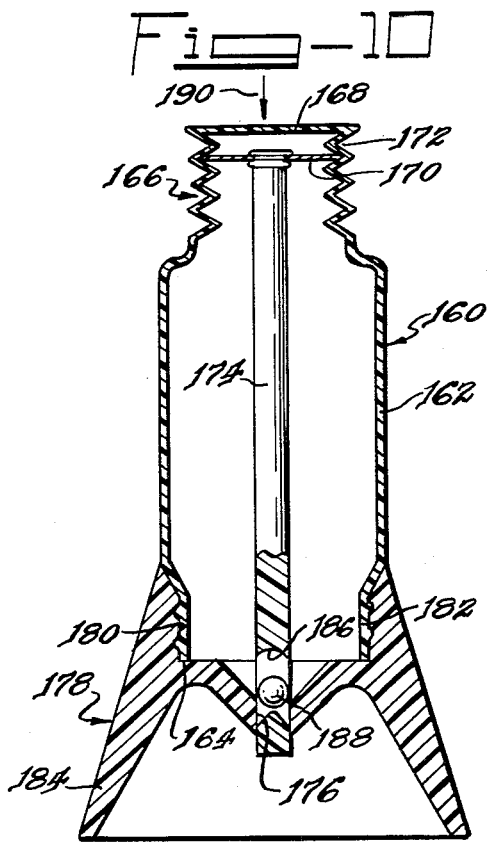
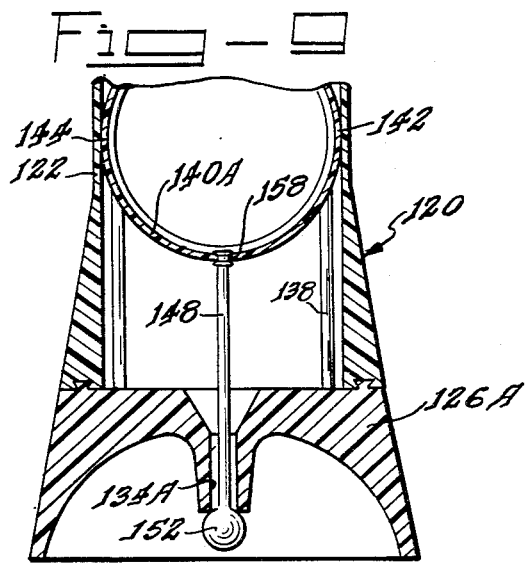
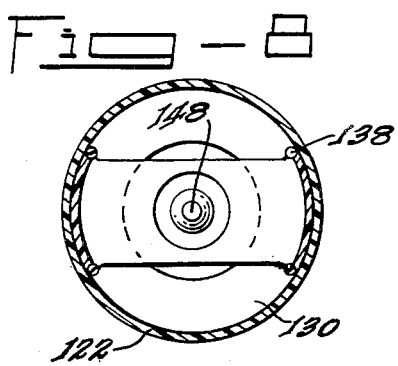
Inventor
Thomas P. Heckman
By: Stone, Nierman,
Burmeister & Zummer
Attorneys

United States Patent Office 3,154,222
Patented Oct. 27, 1964

3,154,222
LIQUID DISPENSER
Thomas P. Heckman, 533 Edgewood Drive,
Flowerfield, Lombard, Ill.
Filed Sept. 13, 1962, Ser. No. 223,425
16 Claims. (Cl. 222—213)

The present invention relates generally to devices for dispensing liquids, such as liquid foods, detergents, medicines, sauces, and the like, including powdered or pulverized solids which act as liquids under flow conditions.

Patent No. 2,772,817, entitled "Dispensing Pump" to Jauch discloses a dispensing pump which is sealed about the opening of a container. The container is inverted to place the pump beneath the contents of the container, and the pump has a compliant member forming a chamber which is in communication with the contents of the container through a lip-type valve. A second lip-type valve discharges the contents of the chamber of the pump. In operation, the chamber of the pump of Jauch becomes filled with the liquid to be dispensed through the first valve, and on compression of the chamber, the first valve remains closed forcing the liquid out of the second valve.

The combination of a container and the dispensing pump of Jauch has a number of disadvantages. It is difficult to clean the chamber of the dispensing pump, thus making the use of such a dispensing pump for foods undesirable. Also, the second valve which communicates between the chamber of the pump and the outside tends to leak with liquids of low viscosity. Further, residue from the dispensed liquid may seal the second valve and impair operation of the pump.

Patent No. 2,299,572, entitled "Dispensing Package" to Estenes also discloses a container with a pump attached to the opening of the container, and the pump of the Estenes patent has a chamber with an aperture between the chamber of the pump and the container rather than the valve of the Jauch patent. In addition, the chamber of the pump of Estenes is formed by a bellows, and the volume of this chamber is decreased by compression of the bellows, thus forcing liquid contained within the pump chamber therefrom through a plurality of apertures. While this structure avoids the use of two valves, such as in Jauch, thus eliminating the problems of maintaining a second valve, the other objections to the Jauch device are also present in the Estenes device.

Patent No. 2,989,216 of Moro-Lin entitled "Portion Dispensing Container" discloses a squeeze container which utilizes a dispensing chamber at one end of the container and requires no valves. The Moro-Lin device, however, requires inversion of the container in order to fill the dispensing chamber and then reinversion of the container in order to force the contents of the dispensing chamber therefrom.

It is an object of the present invention to provide an improved liquid dispenser which does not have the disadvantages of prior art devices. In particular, it is an object of the present invention to provide a liquid dispenser which may be operated beneath a container of the liquid to be dispensed and which will provide a positive shut-off of the liquid except during dispensing periods and will also assure opening of the valve of the dispenser when it is desired to dispense the liquid.

It is a further object of the present invention to provide a dispensing attachment for use with a bottle or container of the liquid to be dispensed and which is suitable for use with the bottle in an inverted position and which is not limited by the disadvantages of the prior devices.

These and further objects of the present invention will become readily apparent to those skilled in the art from a further consideration of this disclosure, particularly when viewed in the light of the drawings, in which:

FIGURE 7 is a vertical sectional view of still another embodiment of a combination dispenser and container constructed according to the teachings of the present invention;

FIGURE 8 is a sectional view taken along the line 8—8 of FIGURE 7;

FIGURE 9 is a fragmentary vertical sectional view illustrating a combination dispenser and container modified from that of FIGURE 7; and FIGURE 10 is a vertical sectional view of a pill dispenser constructed according to the teachings of the present invention.

Figure 1:
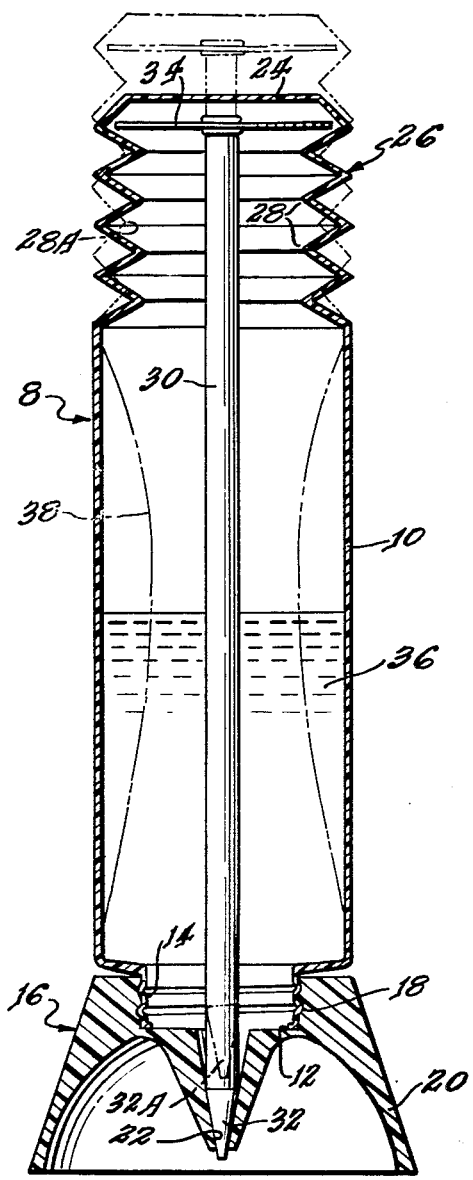
FIGURE 1 is a vertical sectional view of a combination container and dispenser constructed according to the teachings of the present invention.

FIGURE 1 illustrates one embodiment of the present invention in which the dispensing mechanism is an integral part of the container itself. The container, designated 8, has a cylindrical wall 10 of pliant material, such as polyethylene plastic, polyurethane plastic, or hard rubber. The cylindrical body 10 extends from a mouth 12 at one end which is provided with a threaded neck 14 for receiving a cap 16. The cap 16 has a threaded recess 18 which engages the threads of the neck 14 of the container and forms a seal. The cap 16 also is provided with a cup-shaped flange 20 which is adapted to mount the container in vertical position on a flat surface, the flange 20 extending circularly about the recess 18 and depending therefrom. The cap 16 also has an axial opening 22 with a bore tapering conically from the recess 18. The opening 22 is utilized to remove contents from the container.

The end of the container 8 opposite the mouth 12 thereof is provided with a flat disc 24 which is circular in shape, and the disc 24 is mounted on the end of the cylindrical wall 10 opposite the mouth 12 by a bellows region 26. The bellows region 26 is formed by a plurality of grooves 28 which extend coaxially about the axis of the container 8 at spaced intervals. The grooves 28 are disposed on planes normal to the axis of the container.

A pin 30 is disposed on the axis of the container 8, and the pin 30 has a pointed end 32 which engages the conical shaped opening 22 of the cap 16. The end of the pin 30 opposite the opening 22 is mounted on a circular plate 34 which is disposed between the disc 24 of the container 8 and the groove 28A which is adjacent to the disc 24.

The plate 24 is sufficiently rigidly mounted on the container 8 to maintain the pin 30 in alignment with the axis of the container. The container 8 also contains a body of liquid, designated 36. When the cylindrical walls 10 of the container 8 are depressed to the position indicated by the dashed line 38, the force of the entrapped air within the container 8 forces the accordion region 26 to extend, thus moving the plate 34 away from the opening 12 of the container 8. Since the pin 30 is mounted on the plate 34, the pin therefore is translated away from the opening 22, as indicated by the dashed line 32A. As a result, the liquid body 36 from within the container 8 may flow through the opening downwardly. Further, the pressure generated by squeezing or compressing the container 8 is also exerted upon the body of liquid 36 within the container, thereby causing the liquid to be expelled under pressure.

The body of liquid 36 within the container 8 may be any one of a wide range of substances. It may be a relatively viscous liquid, since the pressure within the container will force the viscous liquid from the container. It may be a relatively non-viscous liquid, since the pin 30 forms a tight seal against the passage of liquid through the opening 22. It may also be a pulverized solid, such as salt, pepper, or the like, since these will act similar to liquids under flow conditions.

Figure 2:
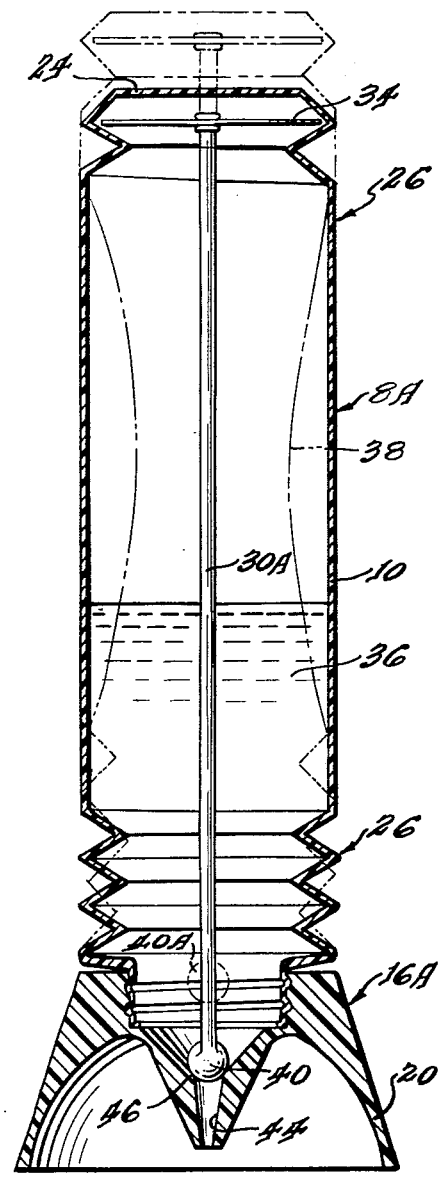
FIGURE 2 is a vertical sectional view of a modified form of container and dispenser constructed according to the teachings of this invention.

FIGURE 2 illustrates a modified construction of the container and dispenser illustrated in FIGURE 1, and like reference numerals will be utilized for identical parts. In FIGURE 2, the container is designated 8A, and the container differs from the construction of the container of FIGURE 1 in that the end of the pin 30A employs a spherical terminus 40. It is to be noted that squeezing of the container 8A elevates the spherical terminus 40 to the position designated 40A, thus spacing the terminus of the pin 30A from the cap 16A.

The cap 16A of the embodiment of FIGURE 2 is similar to the cap 16 of the embodiment of FIGURE 1, except that the opening 44 which extends along the axis of the cap and the axis of the cylindrical walls 10 of the container 8A has a smaller diameter orifice 46 which confronts and abuts the spherical terminus 40 of the pin 30A. The diameter of the orifice 46 is substantially smaller than the diameter of the spherical terminus 40 of the pin so that the pin may abut this orifice 46 and utilize it as a seat in providing a sealing valve for the container and dispenser.

Figure 3:
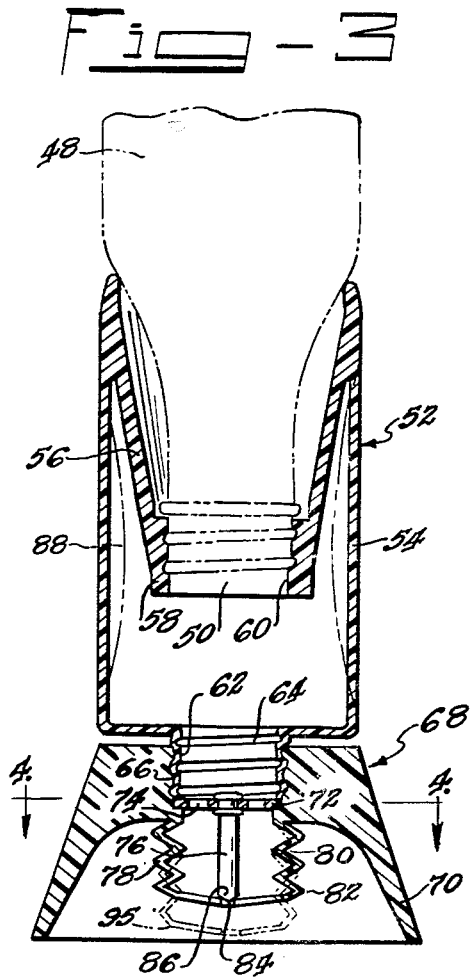
FIGURE 3 is a vertical sectional view of an attachment for a bottle for dispensing liquids and pulverized solids.

FIGURE 3 illustrates a dispenser for use with a bottle type container which is constructed according to the teachings of the present invention. In FIGURE 3, the bottle is designated 48, and may be any conventional bottle such as is utilized for the handling and sale of catsup and the like. The bottle 48 is provided with a neck 50, as is conventional. The dispenser has a body 52 with a cylindrical portion 54 constructed of compliant material. One end of the cylindrical portion 54 of the body 52 supports an inwardly depending conical portion 56 which terminates at its end opposite the cylindrical portion 54 in a neck 58 carrying a circular opening 60 which is adapted to engage the neck 50 of the bottle 48. The neck 50 of the bottle 48 and the neck 58 of the depending portion 56 of the dispenser both have threads thereon which are adapted to mix to form a fluid tight seal between the neck 50 of the bottle and the neck 58 of the dispenser. As is clearly illustrated in FIGURE 3, the end of the cylindrical portion 54 of the body 52 of the dispenser abuts the surface of the bottle 48, thereby lending support to the bottle 48 in the dispenser.

The opposite end of the cylindrical portion 54 from the depending portion 56 also terminates in a neck 62 which is provided with threads 64. The neck 62 threadedly engages an opening 66 in the cap 68, the opening 66 being on the axis of the cap 68 and the cap having a conical outwardly flaring flange 70 extending from the opening 66 to permit the cap 68 to be positioned on a flat surface.

A disc 72 is mounted in the opening 66 of the cap 68 immediately confronting the mouth of the dispenser housing 52. The disc 72 is provided with a plurality of apertures 74, and also mounts a pin 76 which extends from the disc 72 along the axis of the opening 66. A bellows 78 is sealed about the perimeter of the disc 72 and extends about the pin 76. The bellows has a plurality of grooves 80 which are separated by ridges 82, the grooves 80 and ridges 82 being totally disposed in planes normal to the axis of the pin 76. Further, the bellows has an opening 84 confronting the end of the pin 76 and the pin has a point 86 thereon adapted to mate with the opening 84. The point 86 of the pin is not able to pass through the small opening 84 of the bellows, but the bellows exerts a sufficient force on the end of the pin 76 to cause the opening 84 to become wedged against the pin forming a fluid tight seal.

Operation of the dispenser illustrated in FIGURE 3 may be described in combination with a bottle 48 containing a liquid, such as catsup or syrup, or the like. The bottle is positioned in the inverted position, that is, the flange 70 of the cap 68 is utilized to position the dispenser and bottle on a flat surface. Thereafter, the contents of the bottle flow downwardly into the container 52 of the dispenser and also pass through the openings 74 into the bellows. The bellows, however, exerts a sufficient spring tension on the apertured portion 84 thereof that the bellows is maintained in engagement with the pin 76 so that liquid cannot drip or seep between the pin 76 and the surfaces of the opening 84. However, when the wall 54 of the container 52 is depressed or squeezed, thereby assuming the position in the dashed line indicated 88, pressure is built up within the container 52 which is transmitted by the fluid into the bellows. As a result, the bellows becomes extended, namely the grooves 80 and ridges 82 become further expanded to assume the dotted position indicated at 95, thereby freeing the bellows from the end of the pin 76 and permitting the liquid to flow freely through the aperture 84. It is also to be noted that the fluid is under pressure as a result of squeezing the wall 54 of the container 52, so that the fluid is emitted from the bellows under pressure.

Figure 5:
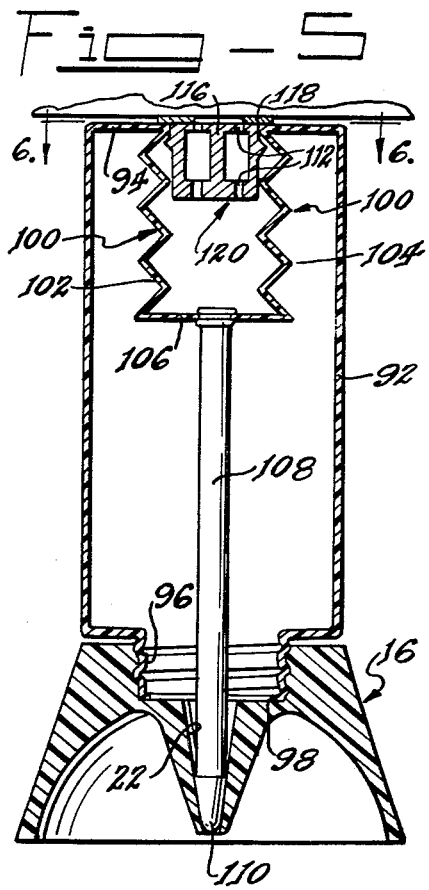
FIGURE 5 is a vertical sectional view of a combination container and dispenser which constitutes a further embodiment of the present invention.
Figure 4:
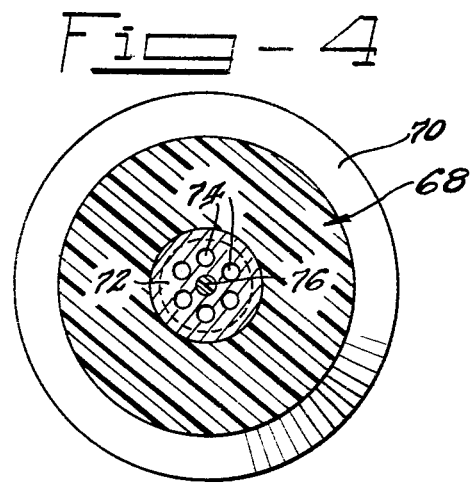
FIGURE 4 is a sectional view taken along the line 4—4 of FIGURE 3.
Figure 6:
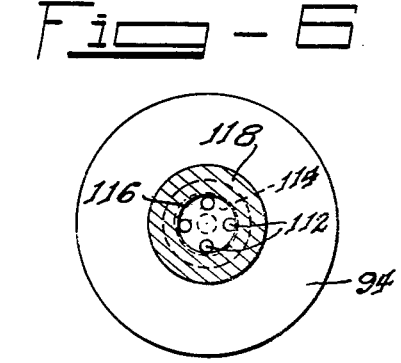
FIGURE 6 is a sectional view taken along the line 6—6 of FIGURE 5.

FIGURES 5 and 6 illustrate another embodiment of the present invention. In this embodiment, a combination container and dispenser is illustrated which has a casing 92 which is cylindrical in shape and constructed of pliant material. The casing 92 has a flat end 94 and a neck 96 opposite the end 94 which terminates in an opening or mouth 98. A cap which is identical to the cap 16 of FIGURE 1 is mounted on the neck 96 of the container and bears the reference numeral 16.

A bellows 100 is mounted on the end 94 of the container, and the bellows 100 is formed by a plurality of grooves 102 spaced between protrusions 104, the grooves 102 and protrusions 104 being disposed on parallel planes normal to the axis of the cylindrical portion 92 of the container. The bellows 100 is mounted on the end 94 of the container at one end and has a disc 106 at the other end which supports a pin 108. The pin 108 is disposed on the axis of the cylindrical portion 92 of the container and terminates at its end opposite the bellows 100 in a pointed end 110 which engages the conical opening 22 of the cap 16.

The bellows 100 contains ambient atmosphere which is permitted to pass from the exterior of the bellows through a plurality of small openings 112. The openings 112 are disposed in a circular ring 114 of plastic which is disposed between a central circular pole 116 and a circular ring 118. The pole 116 and ring 118 are constructed of ferromagnetic material and are interconnected by a flat yoke 120. The pole 116 contains a permanent magnetic structure, so that the end thereof which is disposed on the plane of the end 94 of the container carries a north pole, and the ring 118 carries a south pole. In this manner, the magnetic structure formed by the poles 116 and 118 and the yoke 120 may be utilized to mount the container and contents on a horizontal ferromagnetic plate, such as the underside of a metal cabinet.

The container is partially filled with the liquid to be dispensed, and since the walls 92 thereof are of compliant material, the walls may be squeezed or compressed. Squeezing the walls causes the bellows 100 to collapse, that is, causes the pin 108 to move upwardly out of the conical opening 22 of the cap 16 and permits the liquid within the container to pore through the opening 22. Since the contents of the container will be placed under pressure by the act of squeezing the container, the contents will be emitted from the conical opening 22 under pressure. If it is desired to remove the container from a horizontal plate of ferromagnetic material it is only necessary to slide or pull it away from the plate in order to break the magnetic circuit between the pole 116 and the ring 118.

FIGURES 7, 8 and 9 illustrate a further modification of the present invention. In these figures, a combination container and dispenser is illustrated having a container 120 with a cylindrical wall 122 of pliant material, a flat disc-shaped end 124 extending between one end of the cylindrical wall 122, and a cap 126 mounted and extending between the other end of the cylindrical wall 122. As illustrated, the end of the wall 122 adjacent to the cap 126 flares outwardly to provide a substantially greater thickness of wall, and this end of the wall 122 is provided with a circular groove 128 which has a wedge-shaped cross-section. Further, the cap 126 has a flat surface 130 confronting the wall 122, and the surface 130 has a wedge-shaped circular protrusion 132 which mates within the groove 128 to seal and fasten the cap 126 to the cylindrical wall 122. The cap 126 has a circular bore 134 on the axis thereof which is also disposed on the axis of the cylindrical wall 122 of the container 120, and a circular recess 136 is disposed surrounding the bore 134 confronting the container 120.

As is best illustrated in FIGURES 7 and 8, four parallel posts 138 extend normally from the surface 130 of the cap 126 parallel to the axis of the cylindrical portion 122 of the container 120, and the posts 138 extend substantially the entire length of the container 120. A circular segment 140 is mounted onto the four posts 138 with the plane of the segment on the axis of the cylindrical portion 122 of the casing 120. The circular segment 140 abuts opposite sides of the cylindrical portion 122 of the casing 120 at points designated 142 and 144, but is spaced from all other points of the casing 120. It is to be noted that the circular segment 140 has its radial plane traversing the central axis of the cylindrical portion 122 of the container 120. The circular segment 140 has a small aperture 146 located on the axis of the cylindrical portion 122 of the container confronting the end 124 thereof, and a rod 148 is mounted on the circular segment 140 in the aperture 146. The rod 148 extends through the center of the circular segment 140 and through a much larger opening 150 disposed on the axis of the cylindrical portion 122 of the container to terminate in a spherical terminus 152 which abuts the mouth or seat of the bore 134 to form a fluid seal.

The entire interior of the container 120 is filled with the liquid to be dispensed, including the interior of the circular segment 140. When it is desired to dispense the liquid, the cylindrical portion 122 of the container is squeezed or depressed adjacent to the points 142 and 144, thereby causing it to assume the dashed line indicated by the reference numeral 154. Depressing or squeezing of the cylindrical portion 122 distorts the circular segment 140 and causes it to assume an oval shape as indicated by the dashed line 156. As a result of distortion of the circular segment 140, the rod 148 is translated away from the seat or opening of the bore 134 of the cap 126, thereby opening the aperture or bore 134 to the passage of liquid and permitting the liquid to be discharged. It is also to be noted that the liquid is under pressure as a result of squeezing of the cylindrical portion 122 of the container 120. When the pressure causing distortion of the container is removed, the container 120 will assume its original shape, thus permitting the circular segment 140 to assume its circular position and forcing the rod 148 into abutment with the surface of the recess 136. The spherical terminus 152 of the rod will then once again seat in the opening or seat of the bore 134 and seal the bore 134 from further passage of liquid.

It is to be noted, that in FIGURE 7, the spherical terminus must be raised to open the bore 134 to the passage of liquid. In the modification of FIGURE 9, the rod 148 also is provided with the spherical terminus 152, but the spherical terminus is on the exterior side of the cap, designated 126A. As a result, the rod must move to move the spherical terminus 152 downwardly to open the bore 134A of the cap 126A.

In FIGURE 9, the container 120 is of identical construction to the container of FIGURES 7 and 8, and like reference numerals are therefore employed. Also, the circular segment 140A is similar to the circular segment of FIGURE 7, but the rod 148 is mounted in a small bore 158 located in the circular segment 140 on the axis of the cylindrical portion 122 of the casing 120 confronting the cap 126A. In this manner, compression or distortion of the casing at the points 142 and 144 results in movement of the rod 148 downwardly, thus moving the spherical terminus 152 away from the exterior mouth of the bore 134A and permitting the flow of liquid through the bore 134A.

In construction, the entire container 120 and cap may be constructed of plastic, and the cylindrical portion 122 must be pliant. Further, the circular segment 140A also must be resilient in that it provides the spring pressure for maintaining the spherical terminus 152 in abutment with the mouth of the bore 134 or 134A of the cap 126 or 126A.

FIGURE 10 illustrates a pill dispenser constructed according to the teachings of the present invention. In FIGURE 10, a container 160 is illustrated having cylindrical walls 162 terminating at its lower end in a mouth 164. The cylindrical walls 162 terminate at its upper end in a bellows 166 which is similar in construction to that illustrated in the embodiment of FIGURES 1 and 2. The bellows 166 has a top plate 168 which is disposed normal to the axis of the cylindrical portion 162 of the container 160, and a disc 170 disposed within the bellows and mounted between two grooves 172 of the bellows 166 supports and aligns a cylindrical rod 174 on the axis of the cylindrical walls 162 of the container 160. The rod 174 extends through the mouth 164 of the container and passes through a cylindrical bore 176 in a cap 178. The cap 178 has an orifice 180 which engages a neck 182 of the container 160 and seals the cap to the container. The cap 178 also has a conical depending flange 184 which is adapted to mount the container 160 with its contents on a horizontal surface.

The interior of the container 160 is filled with pills, that is, discrete particles which are in the form of lumps of fixed size, preferably spherical. The rod 174 has an opening 186 which extends therethrough at an angle to the axis of the rod immediately adjacent to the cap 178. One of the pills, illustrated at 188 finds its way into this opening 186. A force may then be placed on the top plate 168 of the container 160 in a downwardly direction, as indicated by the arrow 190, thus forcing the bellows 166 to collapse and moving the rod 174 downwardly through the bore 176. When the rod 174 has been moved a sufficient distance, the opening 186 in the rod will clear the cap 178, and the pill 188 will be free to fall from the opening in the rod. Since the rod 174 maintains the bore 176 closed at all times, no additional pills will issue from the container 160. To repeat the process and remove one further pill, the force 190 is removed from the plate or disc 168 permitting the bellows 166 to exert spring pressure on the rod 174 and restore it to its initial position within the container 160. A new pill will thereupon find its way into the opening 186 in the rod 174, so that again applying the force 190 will remove that new pill.

From the foregoing description, those skilled in the arts will readily devise many dispensers within the intended scope of the present invention. Further, the principles of the present invention will be applied by those skilled in the arts to devices other than liquid dispensers. It is therefore intended that the scope of the present invention be not limited by the foregoing disclosure, but rather only by the appended claims.

The invention claimed is:

1. A liquid dispenser comprising a container having pliant exterior walls and an end extending between the walls provided with an aperture therein, the cross sectional area of said container in the region of the pliant walls changing with distortion of the pliant walls of the container, a pin disposed within the container aligned with the aperture and having a diameter greater than the diameter of the aperture, said pin confronting the aperture and being adapted to seal the aperture against liquid flow from within the container, an actuating means having a wall disposed between the interior of the container and a second gaseous region, said wall being mechanically connected to the pin and movable responsive to a pressure difference between the interior of the container and the second region, whereby inward deflection of the walls of the container move the wall of the actuating means to translate the pin away from the aperture.

2. A liquid dispenser comprising a container having pliant exterior walls and an end extending between the walls provided with an aperture therein, a pin disposed within the container aligned with the aperture and having a diameter greater than the diameter of the aperture, said pin confronting the aperture and being adapted to seal the aperture against liquid flow from within the container, and an actuating means disposed within the container defining a cavity of smaller volume than the container, said cavity containing a gaseous atmosphere, said means having a wall remote from the aperture fixedly mounted on the container and a pliant wall portion extending from said wall toward the aperture, and the end of the pin opposite the aperture being mounted on said pliant wall portion whereby inward deflection of the walls of the container translate the pin away from the aperture.

3. A liquid dispenser comprising a container having pliant exterior walls and an end extending between the walls provided with an aperture therein, a pin disposed within the container aligned with the aperture and having a diameter greater than the diameter of the aperture, said pin confronting the aperture and being adapted to seal the aperture against liquid flow from within the container, and an actuating means disposed within the container defining a cavity of smaller volume than the container, said cavity containing a gaseous atmosphere, said means having a wall remote from the aperture fixedly mounted on the container and a bellows extending from said wall toward the aperture, said means having a second wall sealed to the end of the bellows opposite the first wall, and the end of the pin opposite the aperture being mounted on said second wall of the cavity defining means, whereby inward deflection of the walls of the container translate the pin away from the aperture.

4. A liquid dispenser comprising a container constructed of pliant non-porous material having a cylindrical portion and an opening on the axis of the cylindrical portion, the portion of the container between the cylindrical portion in the opening having pliant walls and the cross sectional area of said portion of the container changing with distortion of the pliant walls of the container, said cylindrical portion having a plurality of spaced circular grooves extending coaxially about the cylindrical portion in parallel planes normal to the axis of the cylindrical portion forming a bellows, expandable along the axis of the cylindrical portion, a rod disposed on the axis of the cylindrical portion of the container having one end mounted on the bellows and the other end removably abutting the container about the opening, said rod being translatable from the opening responsive to a change in the length of the bellows, whereby compression of the portion of the container between the cylindrical portion and the opening extends the bellows to translate the rod from the opening and to permit liquid within the container to flow through the opening.

5. A liquid dispenser comprising the elements of claim 4 wherein the end of the rod abutting the opening of the container is provided with a conical point.

6. A liquid dispenser comprising the elements of claim 4 wherein the end of the rod abutting the opening of the container is provided with a spherical terminus.

7. A liquid dispenser comprising a container constructed of pliant non-porous material having a cylindrical portion and a neck provided with an opening on the axis of the cylindrical portion, said cylindrical portion having a plurality of spaced circular grooves extending coaxially about the cylindrical portion in parallel planes normal to the axis of the cylindrical portion forming a bellows, the cross sectional area of said container in the region between the cylindrical portion and the neck changing with the distortion of the pliant walls of the container, a cap having an orifice therein mounted on the neck of the container with the orifice engaging the neck and forming a fluid seal, said cap being provided with a bore disposed on the axis of the cylindrical portion of the container, a rod disposed on the axis of the cylindrical portion of the container having one end mounted on the bellows and the other end removably abutting the bore of the cap, said rod being translatable from the cap responsive to a change in the length of the bellows, whereby compression of the portion of the container between the neck and the cylindrical portion thereof changes the length of the bellows to translate the rod from the cap and to permit liquid within the container to flow through the bore of the cap.

8. A liquid dispenser comprising a container constructed of pliant non-porous material having a cylindrical portion and a neck provided with an opening on the axis of the cylindrical portion, said cylindrical portion having a plurality of spaced circular grooves extending coaxially about the cylindrical portion in parallel planes normal to the axis of the cylindrical portion forming a bellows, a cap having an orifice therein mounted on the neck of the container with the orifice engaging the neck and forming a fluid seal, said cap being provided with a bore disposed on the axis of the cylindrical portion of the container, the cap having a circular flange extending outwardly therefrom in a direction opposite the container, said flange terminating in a flat plane and being adapted to support the container on a horizontal surface, a rod disposed on the axis of the cylindrical portion of the container having one end mounted on the bellows and the other end removably abutting the bore of the cap, said rod being translatable from the cap responsive to compression of the portion of the container between the neck and the cylindrical portion thereof to permit liquid within the container to flow through the bore of the cap and reseating on said bore of the cap on removal of the compressive force.

9. A cap for use on a squeeze bottle having a neck, comprising a body having an opening extending therethrough adapted to receive the neck of the squeeze bottle from one side thereof, a plate sealed across said opening having a plurality of apertures extending therethrough about the periphery thereof, a pin extending normally from the central portion of the plate, and a bag of non-porous pliant material having an opening sealed about the opening in the cap and an aperture confronting the end of the pin, said pin removably abutting the portion of the bag surrounding the aperture therein and sealing the aperture.

10. A cap for use on a squeeze bottle having a neck, comprising a body having an opening extending therethrough adapted to receive the neck of the squeeze bottle from one side thereof, a plate sealed across said opening having an aperture extending therethrough, a pin extending normally from the central portion of the plate, and a bellows of non-porous pliant material having an opening sealed about the opening in the cap and an aperture confronting the end of the pin, the bellows being formed by a plurality of grooves extending thereabout in planes normal to the axis of the pin, said pin removably abutting the portion of the bellows surrounding the aperture and sealing the aperture.

11. A cap for use on a squeeze bottle having a neck comprising the elements of claim 9 in combination with a flange extending from the cap about the bellows and terminating in a flat plane extending across the flange on the side of the bellows opposite the opening of the cap and adapted to mount the cap on a horizontal surface.

12. A dispenser for use with a bottle comprising a container having pliant walls and means defining an aperture for receiving the neck of the bottle at one end and a neck protruding therefrom at the other end, a cap having a body with an opening extending therethrough, the neck of the container being sealed within the opening of the cap, a plate sealed across the opening on the side thereof opposite the container, said plate having a plurality of apertures extending therethrough about the periphery thereof, a pin extending normally from the central plate, and a bellows of non-porous pliant material having an opening sealed about the opening in the cap and an aperture confronting the end of the pin, said bellows having a plurality of circular grooves extending thereabout in planes normal to the axis of the pin, said pin removably abutting the portion of the bellows surrounding the aperture and sealing the aperture thereof.

13. A liquid dispenser comprising a container having a wall portion constructed of non-porous pliant material and a base portion, the base portion having support posts of pliant material extending therefrom into the wall portion and a bore extending therethrough, a circular segment of compliant material mounted on the support posts in the plane of the bore in the base portion, the circular segment abutting opposite portions of the wall portion of the container, said circular segment having an orifice confronting the bore of the base, a pin mounted on the circular segment remote from the base and extending through the orifice, the end of said pin opposite the circular segment terminating in removable abutment with the base about the bore, whereby compressing the wall portion of the container distorts the circular segment and translates the pin from the bore.

14. A liquid dispenser comprising a container having a wall portion constructed of non-porous pliant material and a base portion, the base portion having support posts of pliant material extending therefrom into the wall portion and a bore extending therethrough from the wall portion of the container, a circular segment of pliant material mounted on the support posts in the plane of the bore in the base portion, the circular segment abutting opposite portions of the wall portion of the container, a pin having a diameter smaller than the diameter of the bore slidably disposed within the bore and mounted on the confronting portion of the circular segment, the end of the pin opposite the circular segment having a spherical terminus and larger diameter than the bore and removably abutting the bore, thereby compressing the wall portion of the container distorts the circular segment and translates the pin in the bore to position the spherical terminus remote from the base.

15. A dispenser comprising a container of pliant non-porous material having a cylindrical portion and an opening on the axis of the cylindrical portion, said cylindrical portion having a plurality of spaced circular grooves extending coaxially about the cylindrical portion in parallel planes normal to the axis of the cylindrical portion forming a bellows, a rod disposed on the axis of the cylindrical portion of the container having one end mounted on the bellows and extending through the aperture slidably, said rod having an opening extending therethrough adapted to contain a pill from within the container, whereby exerting a force on the end of the container to compress the bellows translates the rod in the bore to move the opening in the rod to the exterior of the container and release a pill disposed within said opening.

16. A liquid dispenser comprising the elements of claim 1 wherein the container is cylindrical in the region of the pliant walls.

References Cited in the file of this patent
UNITED STATES PATENTS

| | | |
|---|---|---|
| 936,186 | Tellerson | Oct. 5, 1909 |
| 2,299,572 | Estenes | Oct. 20, 1942 |
| 2,596,592 | Parker | May 13, 1952 |
| 2,772,817 | Jauch | Dec. 4, 1956 |
| 2,857,080 | Elias | Oct. 21, 1958 |